United States Patent [19]

Grabowski et al.

[11] Patent Number: 4,734,389
[45] Date of Patent: Mar. 29, 1988

[54] HIGHLY REFRACTIVE OPTICAL GLASS WITH REFRACTIVE INDICES >1.83 AND ABBE NUMBERS <25, AND WITH VERY GOOD CHEMICAL STABILITY

[75] Inventors: Danuta Grabowski, Taunusstein; Ludwig Ross, Klein-Winternheim; Volkmar Geiler, Mainz, all of Fed. Rep. of Germany

[73] Assignee: Schott Glaswerke, Mainz, Fed. Rep. of Germany

[21] Appl. No.: 827,066

[22] Filed: Feb. 7, 1986

[30] Foreign Application Priority Data

Feb. 11, 1985 [DE] Fed. Rep. of Germany ....... 3504625

[51] Int. Cl.$^4$ .............................................. C03C 3/062
[52] U.S. Cl. ...................................... 501/73; 501/74; 501/75; 501/77; 501/78; 501/901
[58] Field of Search ................................... 501/73–75, 501/77, 78, 901

[56] References Cited

U.S. PATENT DOCUMENTS

| 3,870,531 | 3/1975 | Jahn ................................. 501/901 X |
| 4,526,874 | 7/1985 | Grabowski et al. ............ 501/901 X |
| 4,584,279 | 4/1986 | Grabowski et al. ................... 501/78 |

FOREIGN PATENT DOCUMENTS 55-126549  9/1980  Japan ..................................... 501/73

Primary Examiner—Steven Capella
Attorney, Agent, or Firm—Haight & Associates

[57] ABSTRACT

A highly refractive optical glass ($n_d \geq 1.83$) with high dispersion ($v_d \leq 25$) and very good chemical stability at relatively low density ($\delta \leq 3.5$ g/cm$^3$) consists of (in weight percent) $SiO_2$ 19–25, $Na_2O$ 7–10, $K_2O$ 4–7, $Cs_2O$ 0–12, $CaO$ 0.5–2.0, $BaO$ 9–15, $TiO_2$ 25–30, $ZrO_2$ 0–6, $Nb_2O_5$ 16–20, $WO_3$ 0–3, with $Nb_2O_5:TiO_2 = 0.6$–0.71.

9 Claims, No Drawings

HIGHLY REFRACTIVE OPTICAL GLASS WITH REFRACTIVE INDICES >1.83 AND ABBE NUMBERS <25, AND WITH VERY GOOD CHEMICAL STABILITY

DESCRIPTION OF THE INVENTION

1. Technical Field of the Invention

The invention relates to a new highly refractive optical glass with very good chemical stability.

2. Background Art

The state of the art is reflected in numerous patent applications. JP-OS No. 80-126549 describes the use of $F^-$ ions up to 5% in the $SiO_2$-MO-$M_2O$-$TiO_2$-system with the addition of up to 12 w.% of $Nb_2O_5$ (MO=MgO, CaO, SrO, BaO, ZnO; $M_2O$=$Li_2O$, $Na_2O$, $K_2O$).

The stabilizing effect of $F^-$ ions in conjunction with $SnO_2$, $WO_3$ and $B_2O_3$ is explained in German OS 32 16 451. The glasses described in JP-OS No. 84-086 37 are mainly obtained by application of $SiO_2$, BaO, $K_2O$ and $TiO_2$ up to 35 w.% and of $P_2O_5$ up to 6.5 wt.%. Japanese specifications Nos. 77-25812 and 77-45612 describe glass composition which allegedly can comprise almost all know chemical elements in quantities from 0 to 60 wt.%. The given examples are within a much narrower range; nevertheless they do not produce optical glasses but only glassy-crystalline structures. Also, the stated optical position ($n_d/v_d$) is below the potentials of desirable glasses.

DISCLOSURE OF THE INVENTION

Accordingly, it is a general object of the present invention to provide a composition range for an optical glass which allows the production of highly refractive optical glasses ($n_d \geq 1.83$) with high dispersion ($v_d \leq 25$), very good chemical stability at relatively low density ($\sigma \leq 3.5$ g/cm$^3$) and adequate crystallization stability so that even large castings can be produced with high yield and in accordance with the usual quality standards.

Aother object of the present invention is to provide such glasses which are characterized by a refractive index $n_d$ of 1.83–1.88, and a dispersion index $v_d$ of 22–25.

Another object of this invention is to provide such glasses which are simultaneously characterized by good stain resistance, acid resistance, and alkali resistance.

Another object of this invention is to provide such glasses having a density of 3.0–3.5 g/cm$^3$.

A further object of this invention is to provide such glasses which are substantially free of lead oxide.

Other objects, features, and advantages of the present invention will become more fully apparent to those skilled in the art to which this invention pertains from the following detailed description.

DETAILED DESCRIPTION

Briefly, the above and other objects of this invention are attained in one aspect thereof by providing a glass composition having the above-identified properties characterized by the followng composition (in wt.%):

| Oxide | Useful | Preferred |
| --- | --- | --- |
| $SiO_2$ | 19–25 | 19–23.5 |
| $Na_2O$ | 7–10 | 7–10 |
| $K_2O$ | 4–7 | 4–6.5 |
| $Cs_2O$ | 0–12 | 0.5–12 |
| $Na_2O + K_2O + Cs_2O$ | 11.0–25.0 | 11.5–25.0 |
| CaO | 0.5–2.0 | 0.5–1.5 |
| BaO | 9–15 | 9–15 |
| $TiO_2$ | 25–30 | 25–28 |
| $ZrO_2$ | 0–6 | 2–6 |
| $Nb_2O_5$ | 16–20 | 16–19 |
| $WO_3$ | 0–3 | 0 |
| $Nb_2O_5$:$TiO_2$ | 0.6–0.71 | 0.64–0.68 |

The glasses according to this invention achieve the high refractive index due to the balanced application of $Nb_2O_5$, $TiO_2$ and $ZrO_2$. The ratio of $Nb_2O_5$:$TiO_2$ is preferably 0.60–0.71; optimum conditions are obtained at a ratio $Nb_2O_5$:$TiO_2$=0.64 to 0.68. The crystallization stability of the glasses is also additionally achieved by additions of $SiO_2$, alkaline earths and alkali metals. $Cs_2O$ has a particularly stabilizing effect on devitrification behavior and also, in contrast with the other alkali metals, increases the refractive index.

The glasses of this invention can further contain an effective amount of one or more of the following additional oxides in the amounts indicated:

| | |
| --- | --- |
| $B_2O_3$ | 0.2–3% |
| $Li_2O$ | 0.1–5% |
| PbO | 0.3–1% |
| SrO | 0.2–1% |
| $Y_2O_3$ | 0.2–4% |
| $La_2O_3$ | 0.2–2.5% |
| $Bi_2O_3$ | 0.2–2.5% |
| $Ta_2O_5$ | 0.2–5%. |

The glasses according to the invention satisfy not only the demand for a high refractive index and good crystallization stability, but also the demand for particularly good chemical resistance to acids, alkalis and staining. The corresponding testing methods are described in the Schott-catalogue "Optical Glass" No. 311 d, 1980 and summarized as follows.

The glasses of this invention are characterized by very good resistance to staining and belong to resistance Class FR 0–2, generally Class FR 0 or 1, indicating no blue-brown staining after contact with standard acetate (pH 4.6) for 100 h (Class FR 0); some color change after 100 h (Class FR 1); or some color change after 6 h (Class FR 2).

The glasses furthermore have good resistance to acids and belong to acid resistance Class SR 1 or 2, generally class SR 1, indicating dissolution of a 0.1 m thick layer by 0.5N nitric acid (pH 0.3) after >100 h (Class SR 1) or 100–10 h (Class SR 2).

In addition, the glasses exhibit good alkali resistance and belong to class AR 1–3, generally class AR 1 or 2, indicating decompositions of 0.1 μm thick layer by NaOH (pH 10) at 90° C. in >120 min. (Class AR 1), 120–30 min. (Class AR 2) or 30–7.5 min (Class AR 3).

A further advantage of the glasses according to this invention resides in that the environmentally harmful PbO, normally the main ingredient in glasses of the optical position here under consideration, has been practically wholly replaced by components which are hardly harmful to the environment.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever. In the following Examples, the temperatures are set forth uncorrected in degrees Celsius; unless otherwise indicated, all parts and percentages are by weight.

The glasses according to the invention are produced as follows: The raw materials (oxides, carbonates and nitrates, possibly chlorides) are weighed out. A refining agent such as $As_2O_3$ or $Sb_2O_3$ is added in amounts of 0.1 to 0.5 wt.%, and the whole is well mixed. The glass batch is melted down at approximately 1200°-1300° C. in a platinum or ceramic crucible, then refined and well homogenized with the aid of an agitator. At a casting temperature of 1150°-1190° C. the glass is then worked to the desired dimensions.

| | Sample Melt for 100 kg calculated glass. | |
|---|---|---|---|
| oxide | weight | raw material | weighed amount (kg) |
| $SiO_2$ | 22.80 | quartz powder | 22.83 |
| $Na_2O$ | 9.5 | $Na_2CO_3$ | 16.24 |
| $K_2O$ | 5.50 | $K_2CO_3$ | 8.09 |
| $Cs_2O$ | 0.50 | $Cs_2CO_3$ | 6.58 |
| CaO | 1.00 | $CaCO_3$ | 1.78 |
| BaO | 9.50 | $BaCO_3$ | 12.41 |
| $La_2O_3$ | 2.50 | $La_2O_3$ | 2.50 |
| $TiO_2$ | 28.00 | $TiO_2$ | 28.06 |
| $ZrO_2$ | 2.50 | $ZrO_2$ | 2.51 |
| $Nb_2O_5$ | 18.00 | $Nb_2O_5$ | 18.00 |
| | | | 119.10 |
| $As_2O_3$ | 0.20 | $As_2O_3$ | 0.20 ref. agent |
| | | | 119.30 kg Batch |

Table 1 comprises 13 similarly prepared examples in the composition ranges specified. The properties of the Sample Melt glass are listed in Table 1, Example 6.

The preceding examples can be repeated with similar success by substituting the generically or specifically described reactants and/or operating conditions of this invention for those specifically used in the examples. From the foregoing description, one skilled in the art to which this invention pertains can easily ascertain the essential characteristics thereof and, without departing from the spirit and scope of the present invention, can make various changes and modifications to adapt it to various usages and conditions.

What is claimed is:

1. Highly refractive optical glass having a refractive index $n_d$ of 1.83-1.88, an Abbe number $v_d$ of 22-25 and a density of 3.0-3.5, characterized by the following composition (in wt.%):

| | |
|---|---|
| $SiO_2$ | 19-23.5 |
| $Na_2O$ | 7-10 |
| $K_2O$ | 4-6.5 |
| $Cs_2O$ | 0.5-12 |
| $Na_2O + K_2O + Cs_2O$ | 11.5-25.0 |
| CaO | 0.5-1.5 |
| BaO | 9-15 |
| $TiO_2$ | 25-28 |
| $ZrO_2$ | 2-6 |
| $Nb_2O_5$ | 16-19 |
| $Nb_2O_5:TiO_2$ | 0.64-0.68. |

2. Glass according to claim 1, further containing 0.2-3 wt.% $B_2O_3$.

3. Glass according to claim 1, further containing 0.1-5 wt.% $Li_2O$.

4. Glass according to claim 1, further containing 0.3-1 wt.% PbO.

5. Glass according to claim 1, further containing 0.2-1 wt.% SrO.

6. Glass according to claim 1, further containing 0.2-4 wt.% $Y_2O_3$.

7. Glass according to claim 1, further containing 0.2-2.5 wt.% $La_2O_3$.

8. Glass according to claim 1, further containing 0.2-5 wt.% $Bi_2O_3$.

9. Glass according to claim 1, further containing 0.2-5 wt.% $Ta_2O_5$.

TABLE 1

| Oxide | 1 | 2 | 3 | 4 | 5 | 6 | 7 | 8 | 9 | 10 | 11 | 12 |
|---|---|---|---|---|---|---|---|---|---|---|---|---|
| $SiO_2$ | 19.57 | 22.02 | 19.80 | 22.30 | 22.30 | 22.80 | 23.10 | 20.40 | 19.40 | 23.02 | 23.25 | 22.90 |
| $B_2O_3$ | 2.59 | 2.38 | 2.50 | | | | .50 | | | 2.37 | | |
| $Na_2O$ | 7.49 | 7.84 | 7.50 | 9.25 | 9.50 | 9.50 | 7.50 | 8.25 | 8.25 | 7.84 | 8.50 | 9.20 |
| $K_2O$ | 6.48 | 4.92 | 6.50 | 5.25 | .50 | 5.50 | 5.00 | 4.25 | 4.25 | 4.92 | 5.00 | 5.10 |
| $Cs_2O$ | | | | | .50 | .50 | .50 | .70 | .50 | | 1.45 | .60 |
| CaO | 1.49 | 1.47 | 1.50 | .80 | .80 | 1.00 | .70 | .50 | .70 | 1.47 | .80 | .80 |
| BaO | 14.20 | 10.34 | 13.70 | 13.70 | 10.70 | 9.50 | 13.50 | 14.70 | 14.00 | 10.35 | 12.60 | 13.00 |
| PbO | .80 | | | | | | .40 | | | | | |
| $La_2O_3$ | | | | | | 2.50 | | | | | | |
| $Y_2O_3$ | | 3.35 | | | | | | 3.50 | 3.50 | 3.35 | | |
| $TiO_2$ | 26.46 | 26.49 | 27.00 | 27.50 | 27.00 | 28.00 | 27.70 | 27.00 | 27.50 | 25.99 | 27.30 | 27.30 |
| $ZrO_2$ | | 3.00 | | 2.50 | 5.50 | 2.50 | 2.50 | 2.00 | 2.70 | 2.99 | 2.50 | 2.50 |
| $Nb_2O_5$ | 18.48 | 6.99 | 18.50 | 18.50 | 18.00 | 18.00 | 18.50 | 18.50 | 19.00 | 16.49 | 18.40 | 18.40 |
| $WO_3$ | 2.29 | | 2.80 | | | | | | | | | |
| $As_2O_3$ | .20 | .21 | .20 | .20 | .20 | .20 | .10 | .20 | .20 | .21 | .20 | .20 |
| SrO | | .93 | | | | | | | | .93 | | |
| $Nb_2O_5:TiO_2$ | .70 | .64 | .69 | .67 | .67 | .64 | .67 | .69 | .69 | .63 | .67 | .67 |
| $n_d$ | 1.8436 | 1.8441 | 1.8467 | 1.8456 | 1.8454 | 1.8456 | 1.8562 | 1.8649 | 1.8743 | 1.8372 | 1.8381 | 1.8420 |
| $v_d$ | 23.80 | 24.20 | 23.60 | 23.80 | 23.90 | 23.70 | 23.30 | 23.70 | 23.30 | 24.50 | 24.01 | 23.90 |
| SR-Class | 1.00 | ≦2.0 | 1.00 | 1.00 | 1.00 | 1.00 | ≦2.0 | ≦2.0 | 1.00 | ≦2.0 | ≦2.0 | 1.00 |
| FR-Class | 0.00 | 0.00 | 0.00 | 0.00 | 0.00 | 0.00 | 1.00 | 0.00 | 0.00 | 0.00 | 0.00 | 0.00 |
| AR-Class | | | | 1.00 | | | | | | 1.00 | 1.00 | 1.00 |
| Density, g/cm$^3$ | | | | 3.477 | | | | | | | | 3.425 |

* * * * *